(12) United States Patent
Desloovere

(10) Patent No.: US 12,065,824 B2
(45) Date of Patent: Aug. 20, 2024

(54) WATERTIGHT ANCHORING FOR FASTENING ELEMENTS TO A BUILDING AND ASSOCIATED WORKING METHOD

(71) Applicant: Lorenzo Desloovere, Hooglede-Gits (BE)

(72) Inventor: Lorenzo Desloovere, Hooglede-Gits (BE)

( * ) Notice: Subject to any disclaimer, the term of this patent is extended or adjusted under 35 U.S.C. 154(b) by 283 days.

(21) Appl. No.: 17/433,896

(22) PCT Filed: Jan. 13, 2020

(86) PCT No.: PCT/IB2020/050230
§ 371 (c)(1),
(2) Date: Aug. 25, 2021

(87) PCT Pub. No.: WO2020/174293
PCT Pub. Date: Sep. 3, 2020

(65) Prior Publication Data
US 2022/0162848 A1 May 26, 2022

(30) Foreign Application Priority Data

Feb. 27, 2019 (BE) .................................. 2019/5124

(51) Int. Cl.
*E04B 1/41* (2006.01)
*E04B 1/38* (2006.01)
*E04F 11/18* (2006.01)

(52) U.S. Cl.
CPC ........ *E04B 1/388* (2023.08); *E04B 2001/389* (2023.08); *E04F 11/1812* (2013.01); *E04F 11/1853* (2013.01)

(58) Field of Classification Search
CPC ................ E04B 1/388; E04B 2001/389; E04F 11/1812; E04F 11/1853
USPC .......................................................... 52/702
See application file for complete search history.

(56) References Cited

U.S. PATENT DOCUMENTS 5,836,135 A * 11/1998 Hagan ..................... E04F 19/02
52/836
6,134,847 A * 10/2000 Bifano .................. E04D 13/152
52/302.3
6,293,064 B1 * 9/2001 Larson .................. E04F 13/068
52/302.1
(Continued)

FOREIGN PATENT DOCUMENTS

DE 19816997 A1 10/1999
DE 202004005224 U1 6/2004
(Continued)

OTHER PUBLICATIONS

International Search Report & Written Opinion to corresponding PCT Application No. PCT/IB2020/050230 dated Apr. 1, 2020.

*Primary Examiner* — James J Buckle, Jr.
(74) *Attorney, Agent, or Firm* — Dinsmore & Shohl LLP

(57) ABSTRACT

Watertight anchoring for securely fastening elements to a building, comprising a base or support anchored in a supporting structure of the building; a heat-insulating layer; a first watertight layer applied over the heat-insulating layer and the base or support; a bearing structure fixed to the base or support and a second watertight layer applied over parts of the aforementioned bearing profiles and over parts of the first watertight layer that are adjacent to the respective bearing profiles.

21 Claims, 15 Drawing Sheets

(56) References Cited

U.S. PATENT DOCUMENTS

| | | | | |
|---|---|---|---|---|
| 6,298,609 | B1* | 10/2001 | Bifano | E04F 19/02 52/302.3 |
| 6,427,390 | B1* | 8/2002 | Thies | E04B 1/70 52/302.3 |
| 8,387,321 | B2* | 3/2013 | diGirolamo | E04B 2/58 52/713 |
| 8,397,470 | B2* | 3/2013 | Summons | E04D 12/00 52/700 |
| 8,793,950 | B2* | 8/2014 | Hill | E04B 1/26 52/283 |
| 10,214,910 | B1* | 2/2019 | Inzeo | E04D 13/15 |
| 10,767,379 | B1* | 9/2020 | McLeod | E04B 1/35 |
| 2013/0000223 | A1* | 1/2013 | Hill | E04B 1/26 52/293.3 |
| 2013/0074431 | A1* | 3/2013 | Croasdale | E04B 1/7604 52/309.4 |

FOREIGN PATENT DOCUMENTS

| | | |
|---|---|---|
| DE | 102006022870 A1 | 9/2007 |
| EP | 2594701 A1 | 5/2013 |
| FR | 2013163 A1 | 3/1970 |
| GB | 2436614 A | 10/2007 |
| NL | 8000205 A | 8/1981 |

\* cited by examiner

WATERTIGHT ANCHORING FOR FASTENING ELEMENTS TO A BUILDING AND ASSOCIATED WORKING METHOD

CROSS-REFERENCE TO RELATED APPLICATIONS

The present application is the National Phase entry of International Patent Application No. PCT/IB2020/050230 filed Jan. 13, 2020, the entire contents of which is hereby incorporated by reference into this application.

TECHNICAL FIELD

The present disclosure first and foremost concerns a watertight anchoring for securely fastening elements to a building.

Without limiting the present disclosure thereto, such watertight anchoring is typically intended for securely fastening and anchoring elements such as a balustrade, a gate, a fence, a handrail, a glass panel or the like, or a part thereof, to a building.

In other applications, also other elements such as poles, door posts, lighting, antennas, solar panels or a supporting frame thereof, and so on, can be fastened to or on a building by a watertight anchoring according to the present disclosure.

In general, such a watertight anchoring according to the present disclosure is intended to anchor elements at one first end thereof.

Typically, another free end of the element in question extends up to a relatively large distance from this first anchored end.

Such a watertight anchoring according to the present disclosure is also typically intended for applications wherein, according to the NBN standard and imposed strength class, the element is sometimes subjected to relatively large moments.

This is the case, for example, with elongated elements such as, for example, balustrade posts or lighting poles, which are anchored only at the base and where large moments are exerted on the anchoring, for example, when a person leans against the balustrade or against the lighting post or when, for example, strong wind exerts a great force on the element concerned and the like.

In short, a watertight anchoring according to the present disclosure is typically suitable for anchoring a base of a pole or column, for example the base of a pole of a balustrade or antenna pole, and/or for anchoring an edge of a wall, for example the edge of a glass wall of a terrace fence.

The present disclosure will typically relate to watertight anchorings intended to fasten elements to roofs of a building, but such watertight anchoring can also be applied to other structural parts of a building, such as to facades, for example when a particular cladding is desired, or to a glass passerelle between two buildings.

Usually this will involve fixing elements to a flat roof, but this does not necessarily have to be the case according to the present disclosure, and the roof in question may be completely flat, completely slanted or partially slanted.

A watertight anchoring can be applied to other parts of a building that are arranged in a horizontal, vertical or inclined position.

BACKGROUND

According to the present state of the art, many anchorings for anchoring elements such as balustrades to a roof or other parts of a building structure are already known, but a first disadvantage of such known anchorings is that making and keeping such anchorings watertight is often problematic or complicated and that sometimes even leaks may occur after some time.

Indeed, with the known anchorings, parts thereof usually pierce the roof covering or another cladding, so that the risk of leakage over time is not negligible.

Another disadvantage of such known anchorings is that metal parts are usually used to create them, which are anchored in the structure of the roof or building, leading to the formation of cold bridges, with the formation of condensation and possibly even mould within the building concerned as a result, as well as excessive heat loss from the building.

The aim of the present disclosure is therefore to offer a solution to the aforementioned and/or other problems.

More specifically, the aim of the present disclosure is to provide a watertight anchoring that can be easily achieved and whose watertightness is assured.

An additional aim of the present disclosure is to ensure that the application of a watertight anchoring according to the present disclosure can be done without causing any significant deterioration in the thermal insulating properties of the roof or building.

SUMMARY

To this end, the present disclosure concerns a watertight anchoring for the secure fastening of elements such as a balustrade, a gate, a fence, a railing, a glass panel or the like, or a part thereof, to a building, wherein the watertight anchoring contains at least the following elements:

- a base or support formed by one or several support profiles or support slats that are securely fastened to or anchored in a supporting structure of the building;
- a heat-insulating layer which covers parts of the building, as well as the aforementioned support profiles and support slats or parts thereof, or in which these support profiles and support slats are embedded;
- a first watertight layer applied over the heat-insulating layer and over the base or support;
- a bearing structure which is suspended or fixed to the base or support and which is formed by one or several bearing profiles fixed to or mounted on the base or support by fasteners; and,
- a second watertight layer applied over parts of the above-mentioned bearing profiles and over parts of the first watertight layer adjacent to the relevant bearing profiles.

A first aspect of such a watertight anchoring according to the present disclosure is that it comprises two separate parts which are connected by fasteners, namely a base or support on the one hand, which is anchored in a supporting structure of the building and which forms the part of the watertight anchoring by which the entire structure consisting of the element to be fastened and the watertight anchoring rests on the building, and a bearing structure attached to it on the other hand, which is borne by the base or support and which is intended to directly support and bear the actual element to be fastened.

This two-part structure makes it possible to obtain a very reliable watertightness, wherein, according to the present disclosure, a first watertight layer is provided over the base or support and a second watertight layer over the bearing structure and the first watertight layer.

The first waterproof layer herein forms the watertight seal of the building or roof, as it were.

Furthermore, the second watertight layer is primarily intended to prevent water from penetrating where the fasteners, with which the bearing structure is fixed or suspended to the base or support, pierce the first watertight layer.

According to the present disclosure, the base or support and the bearing structure are typically made of metal, but it is clear that the metal parts can also be made of equivalent alternative materials, such as fibre-reinforced plastics or the like.

Another aspect of a watertight anchoring according to the present disclosure is that it comprises a heat-insulating layer, so that a connection to the roof or building is obtained which is very strong on the one hand and can withstand the forces that are normally exerted on elements such as balustrades and the like, and which is also integrated into a heat-insulating layer of the roof or building on the other hand, so that this thermal insulation of the roof or building experiences little or no negative impact by the installation of the watertight anchoring, for example by forming a cold bridge or the like.

In embodiments of a watertight anchoring according to the present disclosure, the heat-insulating layer consists of mats or sheets made mainly of a hard and little or non-flexible heat-insulating material, so that it can assume a load-bearing function such as, for example, bearing tiles.

This is particularly useful, for example, in yet another embodiment of a watertight anchoring according to the present disclosure wherein a thermal insulating material is provided between the support profiles and/or support slats of the base or support and the supporting structure of the roof or building in order to prevent the formation of a cold bridge to the supporting structure.

In yet another embodiment of a watertight anchoring according to the present disclosure, the bearing structure contains or exhibits one of the following shapes:
- an L-profile with an L-shaped cross-section consisting of two legs that are perpendicular to each other, one leg of which is securely fastened to the base or support, whereas the other leg extends at a certain distance above the plane of the flat roof or building; or,
- a Z-profile with a Z-shaped cross-section containing an intermediate flank connecting two parallel side flanks, one side flank being fixed to the base or support and the other side flank extending at a certain distance above the plane of the flat roof or building.

A aspect of this embodiment of a watertight anchoring according to the present disclosure is that the bearing structure always comprises a part, either a leg of an L-profile or a side flank of a Z-profile, which, after fixing the bearing structure to the base or support, extends at a certain distance above the plane of the flat roof or building, creating, as it were, a floating platform on which the element to be fastened can rest directly.

The bearing structure is herein suspended from the base or support and this bearing structure is borne by the base or support, while the bearing structure itself supports and bears the element to be attached.

The aspect thereof is that, should the second watertight layer be pierced at the aforementioned floating platform for fixing the element to be fastened (such as part of a balustrade) to the bearing structure, no leakage will be caused in the actual roof covering or any other watertight cladding.

Indeed, should any water seep through the second watertight layer via such a piercing of the second watertight layer at such a floating platform, this water will inevitably drip onto the first watertight layer of the roof or building, so that the roof or building itself does not leak.

The present disclosure also relates to a method for securely fastening elements such as a balustrade, a gate, a fence, a handrail, a glass panel or the like, or a part thereof, to a roof or a building.

In principle, such a method according to the present disclosure involves the step of applying a watertight anchoring according to the present disclosure as described above, followed by the step of permanently mounting the element to be fastened to the bearing structure of this watertight anchoring.

More specifically, the method according to the present disclosure comprises at least the following steps;
applying a waterproof anchoring by first forming a base or support by securely mounting one or several support profiles or support slats to or anchoring them in a supporting structure of the roof or building; then covering parts of the roof or building as well as the support or foot, or parts thereof, with a heat-insulating layer and/or embedding the base or support in the heat-insulating layer; in addition, applying a first watertight layer over the heat-insulating layer and the base or support; suspending or fixing a bearing structure to the base or support by securely mounting one or several bearing profiles to the base or support by fasteners; applying a second watertight layer over parts of the above-mentioned bearing profiles and over parts of the first watertight layer that are adjacent to the relevant bearing profiles; and,
securely mounting the element to be fastened to the bearing structure of the watertight anchoring.

BRIEF DESCRIPTION OF THE DRAWINGS

In order to better explain the characteristics of the present disclosure, some embodiments of a watertight anchoring according to the present disclosure and methods according to the present disclosure are described below as an example without being restrictive in any way, with reference to the accompanying figures, in which.

DETAILED DESCRIPTION

Figure 1:
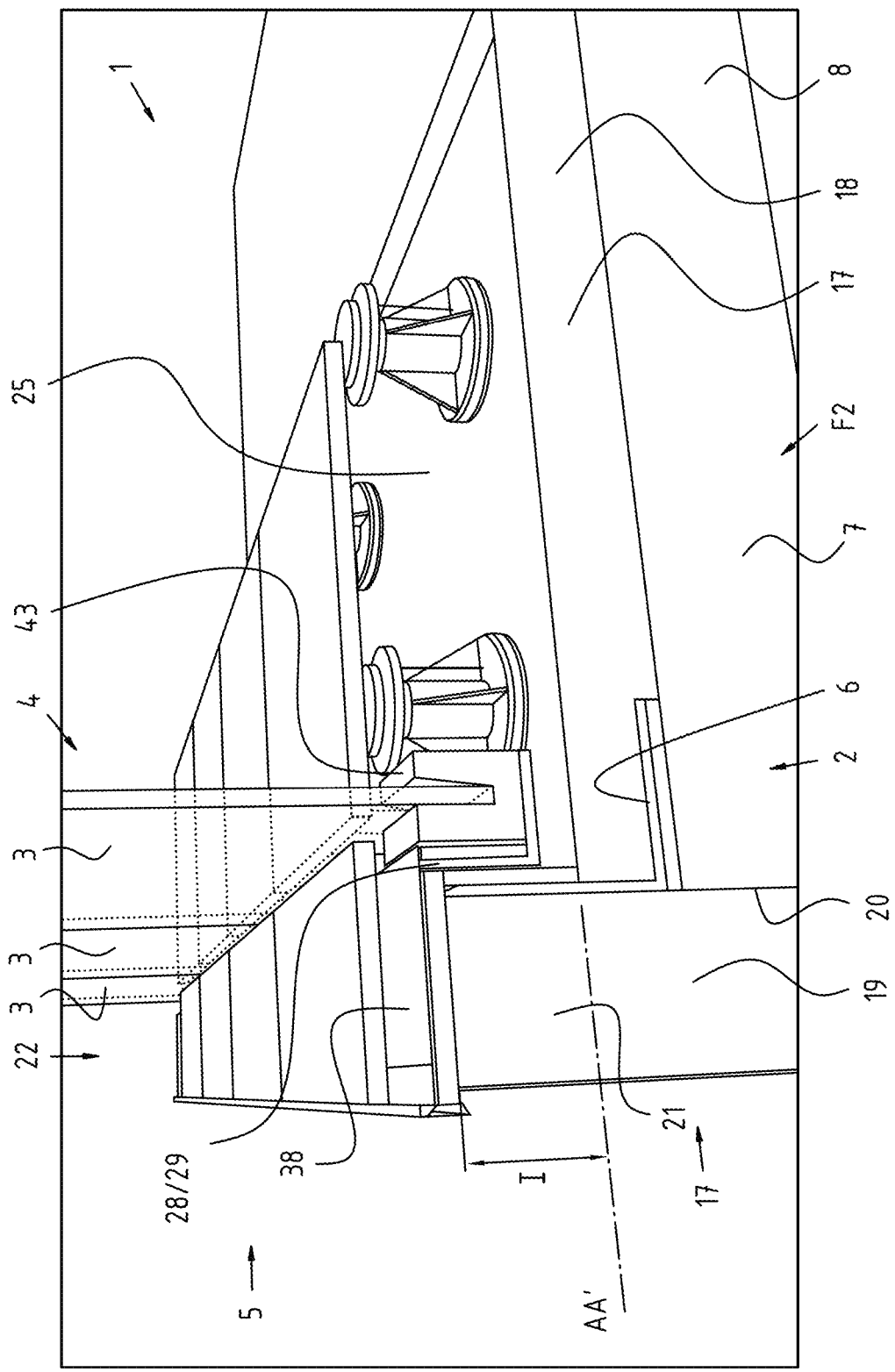
FIG. 1 shows in perspective a section through a roof, wherein a watertight anchoring according to the present disclosure has been applied to anchor glass panels of a screen on the edge of the roof.
Figure 2:
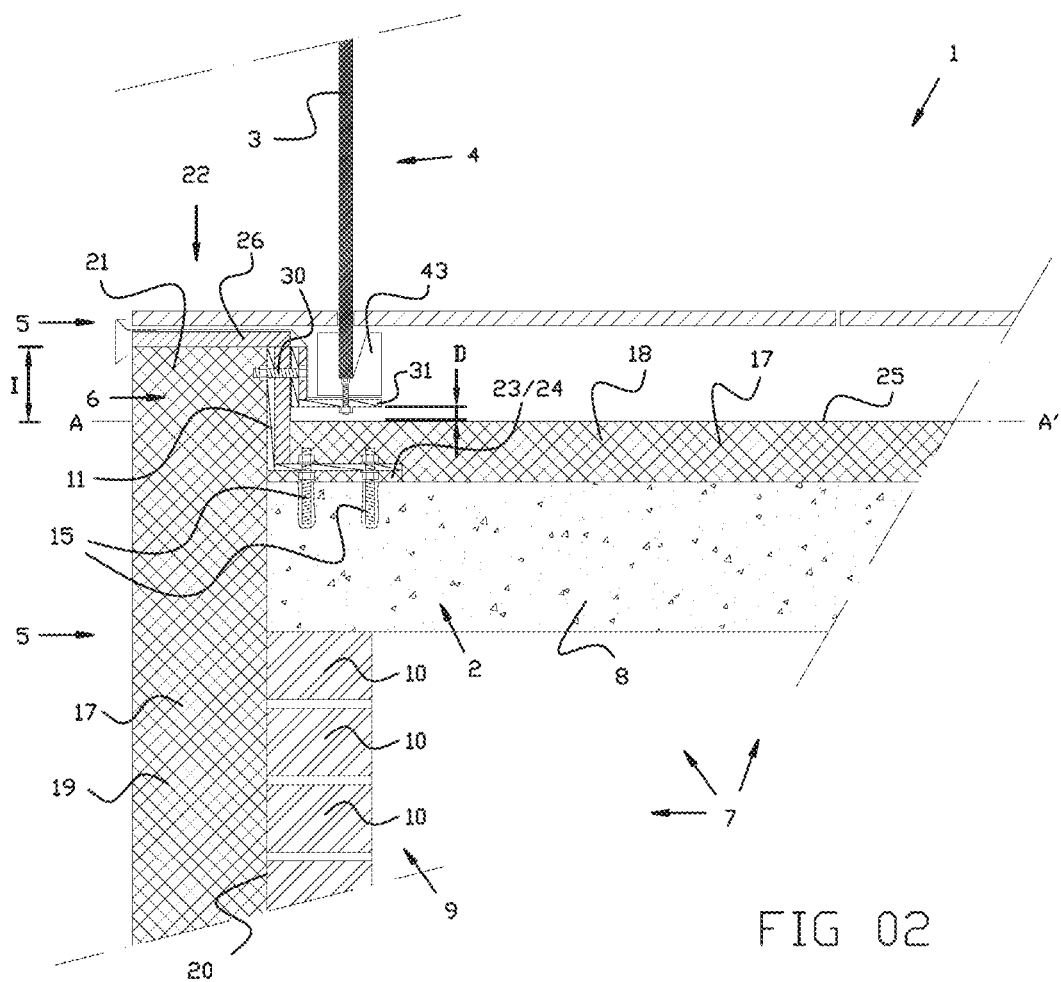
FIG. 2 shows a view according to arrow F2 in the plane of the section.

FIG. 1 shows a roof 1 seen in cross-section, wherein a watertight anchoring 2 is used to anchor and securely fasten glass panels 3 forming a balustrade or fence 4 on a side edge 5 of the roof 1.

The roof 1 is in this case a flat roof, but according to the present disclosure this is not necessarily the case.

The watertight anchoring 2 forms part of the roof 1 and consists of several elements.

A first part of the watertight anchoring 2 is formed by a metal base or support 6.

This metal base or support 6 is realised by securely mounting or anchoring one or several metal support profiles or metal support slats to a supporting structure 7 of the roof 1, so that the base or support 6 forms a metal anchoring 6 in the building or roof 1, as it were.

In the embodiment of FIGS. 1 to 9, the supporting structure is formed by a concrete roof 8 which rests on a side wall 9 which is constructed of rapid building blocks 10.

In this embodiment, the above-mentioned base or support 6 is further realised by an L-profile 11 with an L-shaped cross-section 12 consisting of two legs 13 and 14 placed perpendicularly to each other, one leg 14 of which is securely fastened to the supporting structure 7 of the roof 1, more specifically to its concrete part 8, by bolts 15 and nuts 16 that are chemically anchored in the concrete.

The base or support 6 is designed as an elongated element.

The base or support 6 herein forms a slat or profile with a considerable length, for example with a length of 2 meters or more.

The nuts 16 form adjusting devices which allow the height H of the leg 14 of the L-profile 11 to be adjusted in relation to the supporting structure 7.

Figure 3:
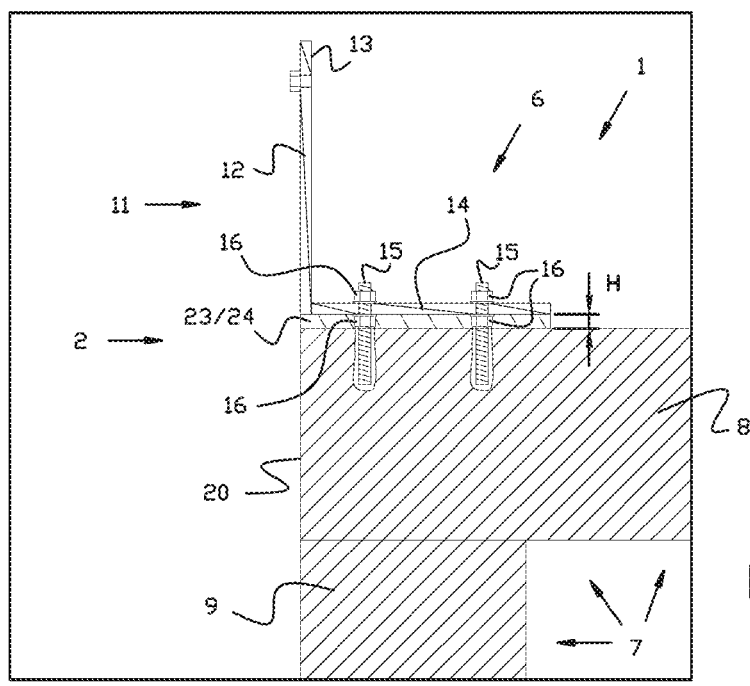
FIG. 3 schematically illustrate an initial step in accordance with a method according to the present disclosure for achieving the watertight anchoring according to the present disclosure shown in FIGS. 1 and 2.

This first step in achieving such a watertight anchoring 2 according to the present disclosure is shown in more detail in FIG. 3.

The watertight anchoring 2 further comprises a heat-insulating layer 17 which covers at least parts of the roof 1, as well as parts of the metal base or support 6.

In principle, the aim is of course to thermally insulate the entire roof 1.

In the example shown, the roof 1 is a flat roof 1 and a part 18 of the heat-insulating layer 17 in this case extends over the concrete parts 8 of this flat roof 1, whereas another part 19 of the heat-insulating layer 14 is applied against the outside 20 of the side wall or side walls 9.

The part 19 protrudes over a height I above the plane AA' of the insulated roof 1 and thus forms a raised edge 21 on the side edge 5 of the flat roof 1 to form a border 22 on the flat roof 1.

According to some embodiments of the present disclosure, a heat-insulating material 23 is also provided between the metal support profile, which in this case is formed by the L-profile 11 and the supporting structure 7 of the roof 1, in order to prevent the formation of a cold bridge to the supporting structure 7.

This heat-insulating material 23 may be, for example, a PU foam.

In the embodiment shown in FIGS. 1 to 9, the heat-insulating material 23 also forms a part 24 of the heat-insulating layer 17, so that the metal support profile 11 is partially embedded in the heat-insulating layer 17, more specifically with its leg 14.

The distance H of the leg 14 in relation to the supporting structure 7 corresponds to the thickness of the part 24 of the heat-insulating layer 17.

In the embodiment shown in FIGS. 1 to 9, the L-profile 11 forming the base or support 6 with its straight upright leg 13 is placed against the border 22 of the flat roof 1, which is formed by the relevant part 19 of the heat-insulating layer 17.

The parts 18, 19 and 24 of the heat-insulating layer 17 consist of mats or sheets made mainly of a hard and little or non-flexible heat-insulating material.

Figure 4:
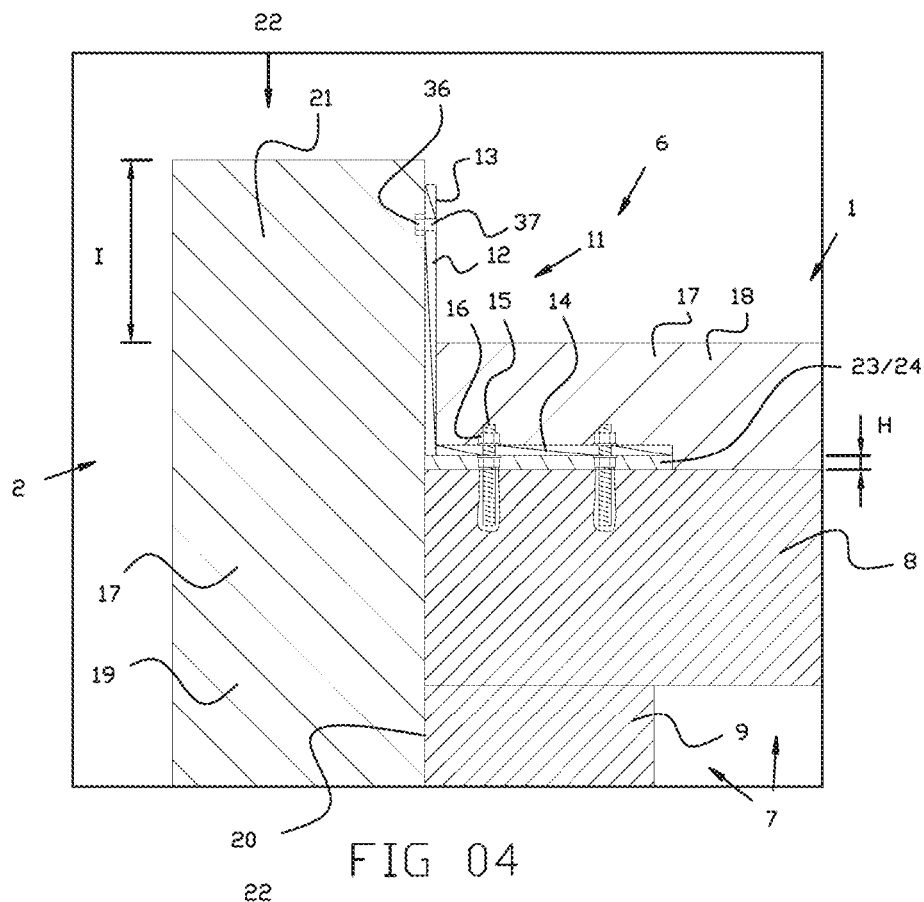
FIG. 4 schematically illustrate a successive step in accordance with the method according to the present disclosure for achieving the watertight anchoring according to the present disclosure shown in FIGS. 1 and 2.

The application of the heat-insulating layer 17 can be considered as a second step of a method according to the present disclosure wherein a watertight anchoring 2 is obtained and the result after performing this second step is shown in FIG. 4.

A watertight anchoring 2 according to the present disclosure further comprises a first watertight layer 25 which is applied over the heat-insulating layer 17 and over the base or support 6.

Prior to applying this first watertight layer 25, in the embodiment shown in FIGS. 1 to 9, a sheeting 26 was first applied at the border 22 on the flat roof 1, more particularly over the top surface 27 of part 19 of the heat-insulating layer 17 and over the part of the base or support 6 which protrudes from the heat-insulating layer 17 and abuts on the border 22, namely over the leg 13 of the L-profile 11.

Figure 5:
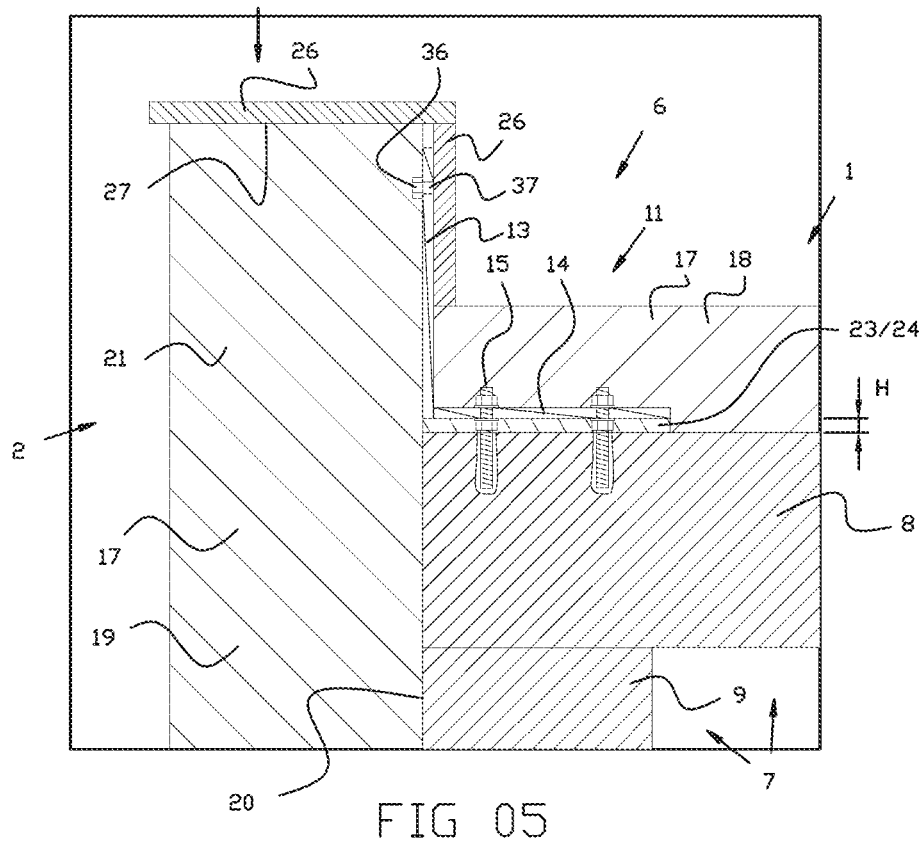
FIG. 5 schematically illustrate a successive step in accordance with the method according to the present disclosure for achieving the watertight anchoring according to the present disclosure shown in FIGS. 1 and 2.
Figure 6:
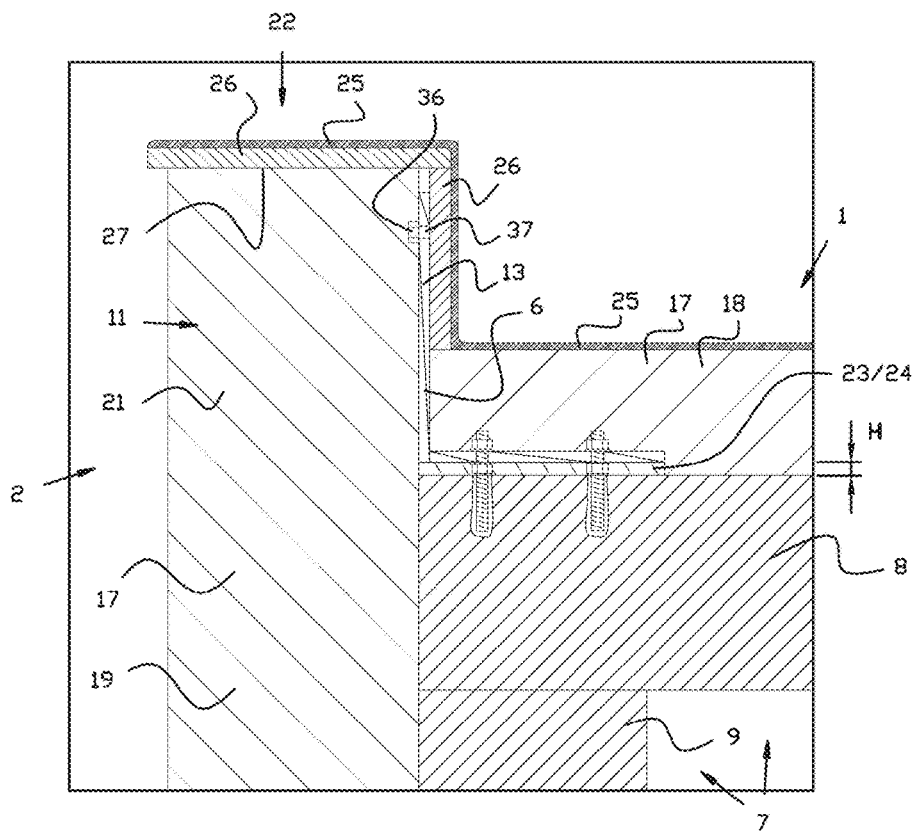
FIG. 6 schematically illustrate a successive step in accordance with the method according to the present disclosure for achieving the watertight anchoring according to the present disclosure shown in FIGS. 1 and 2.

This is shown in FIG. 5, while FIG. 6 shows the result after the application of the first watertight layer 25.

This first watertight layer 25 can be considered as the actual watertight seal for the entire roof 1.

It should be noted that the first watertight layer 25 extends over the entire base or support 6, and thus this base or support 6 is completely covered by the first watertight layer 25.

A watertight anchoring 2 according to the present disclosure further has a bearing structure 28 which is suspended or fixed to the base or support 6 and which is formed by one or several metal bearing profiles 29 which are fixed or mounted to the base or support 6 by fasteners 30.

The bearing structure 28 is designed as an elongated structure.

If several elongated elements have to be placed one after the other for the base or support 6 and/or for the bearing structure 28, they are matched to each other in such a way that module sizes are used, so that the bearing profiles 29 always fit on the support profiles 11.

In the example shown in FIGS. 1 to 9, the bearing structure 28 is achieved by a metal bearing profile 29 in the shape of a metal L-profile 31 with an L-shaped cross-section 32 consisting of two legs 33 and 34 arranged perpendicularly to each other.

The bearing structure 28 herein forms a slat or profile with a considerable length, for example with a length of 2 meters or more.

One leg 33 is herein securely fastened to the base or support 6 and the other leg 34 extends at a certain distance D above the plane AA' of the flat roof 1.

Thus, the bearing structure 28 contains a part 34 which, after fastening the bearing structure 28 to the base or support 6, extends at a certain distance D above the plane AA' of the flat roof 1 or building, so that a floating platform 33 is created, as it were, on which the element 3 or 4 to be attached can rest directly.

In the example shown, the fasteners 30 used to fix the metal bearing profile 29 to the metal support profile or L-profile 11 consist of bolts 35 screwed into nuts 36, with these nuts 36 being securely connected to the L-profile 11, for example by welding them along the length of the L-profile 11 onto the leg 13 thereof.

In other embodiments, for example, holes 37 provided in the leg 13 of the L-profile 11 can be threaded, or also other fasteners 30 can be used for this purpose.

In some embodiments of a watertight anchoring 2 according to the present disclosure, the fasteners 30 are detachable fasteners and/or mechanical fasteners.

In the embodiment shown in FIGS. 1 to 9, the bearing profile 29 is tightened with its leg 33 against the first watertight layer 25 by the fasteners 30 at the sheeting 26 which covers the leg 13 of the L-profile 11.

Figure 7:
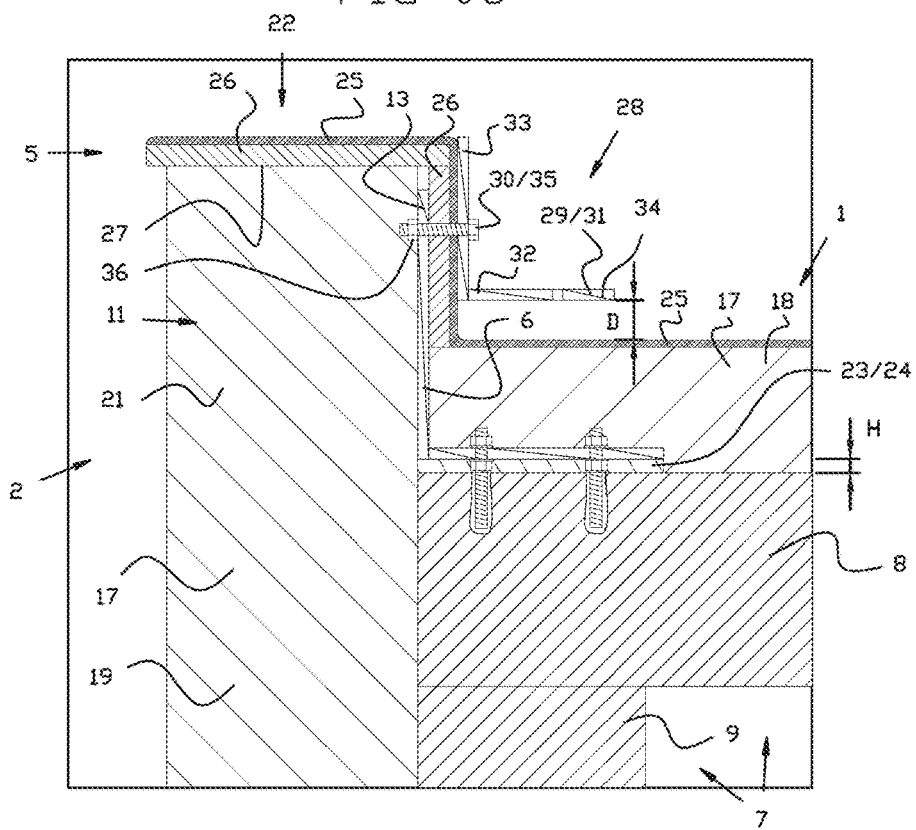
FIG. 7 schematically illustrate a successive step in accordance with the method according to the present disclosure for achieving the watertight anchoring according to the present disclosure shown in FIGS. 1 and 2.

The result obtained after carrying out this step of a method according to the present disclosure involving the use of a watertight anchoring 2 is shown in FIG. 7.

Finally, a watertight anchoring 2 according to the present disclosure also comprises a second watertight layer 38 applied over the top parts of the metal bearing 29 and over parts 39 of the first watertight layer 25 which are adjacent to the relevant metal bearing profile 29.

In this case, according to the present disclosure, at least the top parts of the bearing profile 29 or the bearing profiles 29 of the bearing structure 28 are completely covered by the second watertight layer 38.

In some embodiments, the first watertight layer 25 and the second watertight layer 38 are joined together in these adjacent parts 39, for example by partially melting them together or by gluing or the like.

Figure 8:
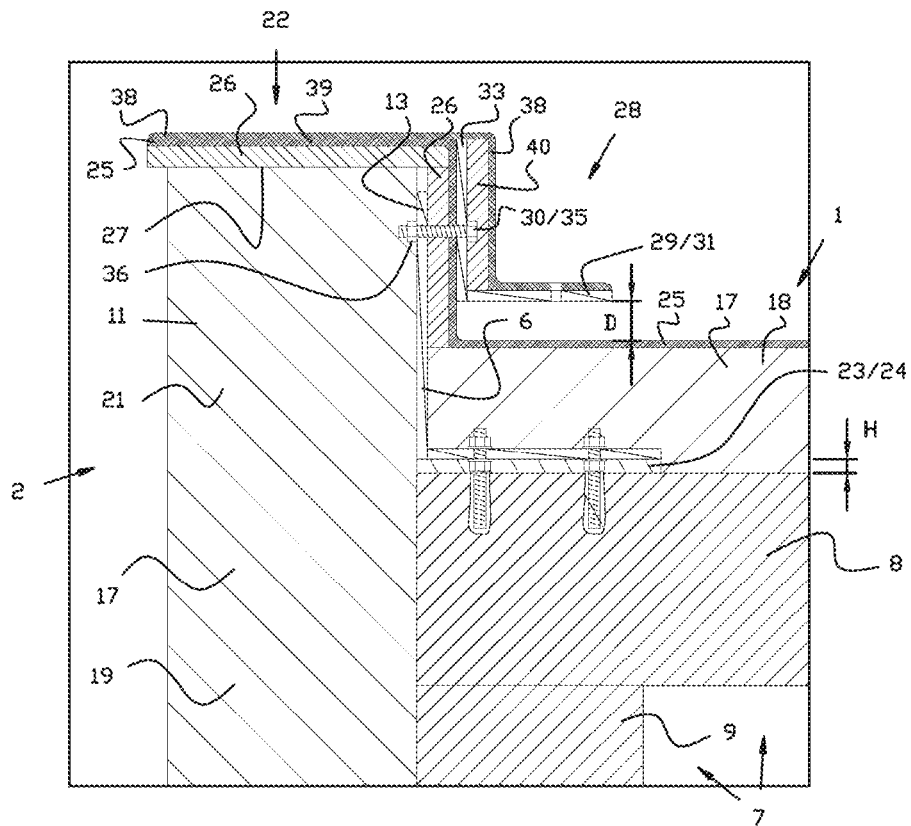
FIG. 8 schematically illustrate a successive step in accordance with the method according to the present disclosure for achieving the watertight anchoring according to the present disclosure shown in FIGS. 1 and 2.

As shown in more detail in FIG. 8, for example, in the embodiment discussed here, before applying a second watertight layer 38, the leg 33 of the bearing profile 29 is first covered with a sheeting 40, into which the heads of the bolts 35 are inserted.

FIG. 8 illustrates a first embodiment of a watertight anchoring 2 according to the present disclosure in a fully finished state.

In order to be able to fix a glass panel 3 of a balustrade 4 to this watertight anchoring 2, the leg 34 of the bearing profile 29, which extends horizontally at a distance D above the roof 1, is provided with holes 41 and, with the aid of fasteners 42, one or several base pieces 43 for a glass panel 3 are fixed to this leg 34 of the bearing profile 29.

The base pieces 43 have a V-shaped slot 44, in which a glass panel 3 can rest.

Figure 9:
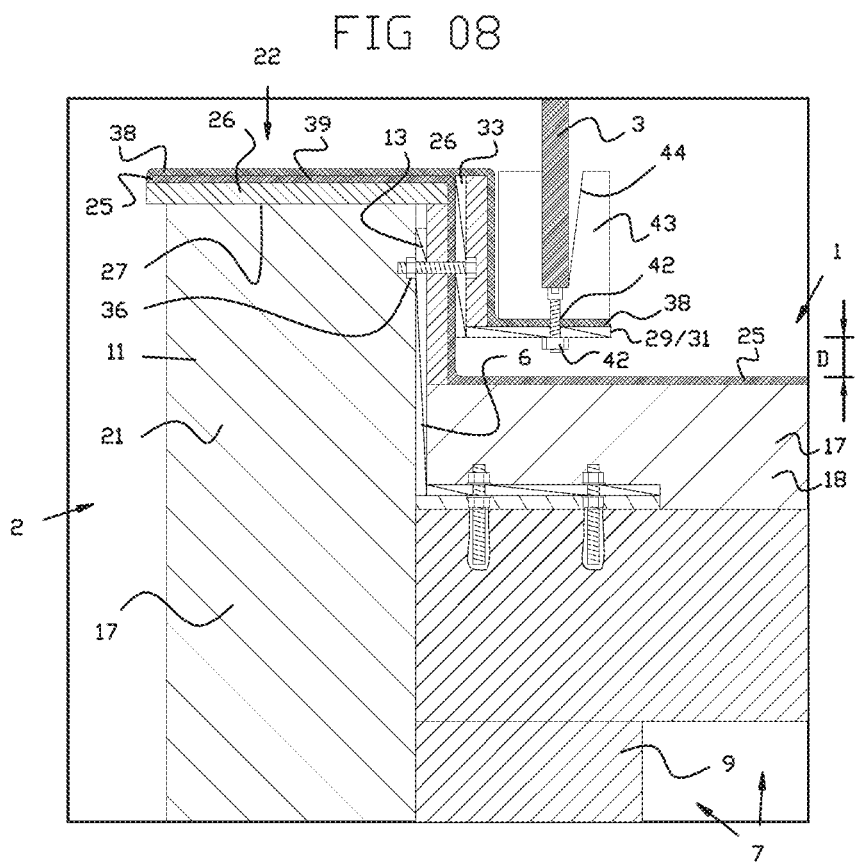
FIG. 9 schematically illustrate a successive step in accordance with the method according to the present disclosure for achieving the watertight anchoring according to the present disclosure shown in FIGS. 1 and 2.

The result of this step is shown in FIG. 9.

Of course, a watertight anchoring 2 according to the present disclosure can be achieved in many other ways.

An example thereof is illustrated by FIGS. 10 to 16.

Figure 10:
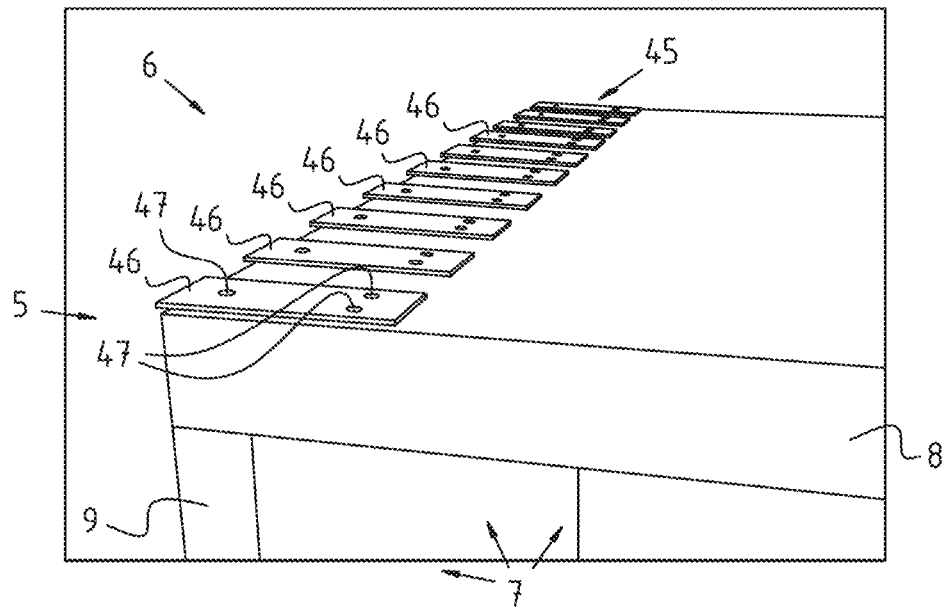
FIG. 10 illustrate in an analogous manner an initial step for realising an alternative embodiment of a watertight anchoring according to the present disclosure.
Figure 11:
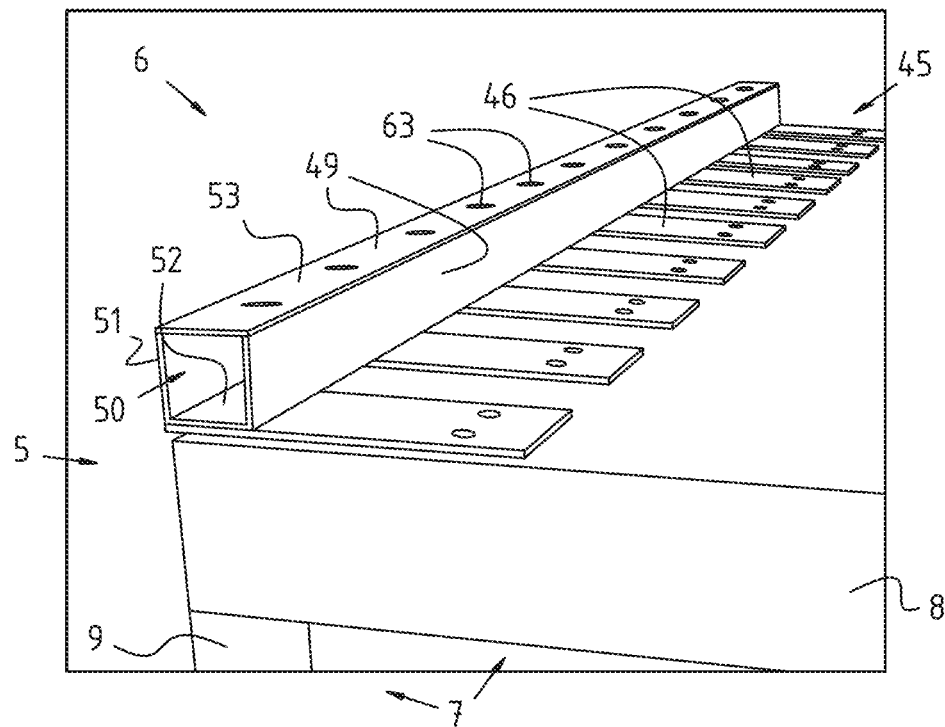
FIG. 11 illustrate in an analogous manner a subsequent step for realising the alternative embodiment of the watertight anchoring according to the present disclosure.

FIGS. 10 and 11 illustrate how a base or support 6 that is anchored in the underlying structure 7 of the roof 1 can be realized in another way.

More specifically, the base or support 6 in this case comprises a series 45 of support slats 46 made, for example, of metal and fastened parallel to each other and at regular intervals to the supporting structure 7 of the roof 1, more specifically to the concrete part 8 thereof.

For this purpose, holes 47 are provided in the metal support slats 46 and fasteners 48 can be used which are not shown in detail in the figures and which may, for example, be similar to the fasteners used in the preceding embodiment and which consist, for example, of nuts and bolts which are chemically anchored in the concrete part 8.

Transversely across this series 45 of support slats 46, adjacent to the side edge 5 of the roof 1, a metal tubular profile 49 with in this case a hollow, square cross-section 50 is also provided.

In the example shown in FIG. 11, the metal tubular profile 49 is composed of a metal U-profile 51 which is fixed with its back 52 to the metal support slats 46 and a metal slat 53 which closes the metal U-profile 51 at the top.

The U-profile 51 or tubular profile 49 is securely fixed to the metal support slats 46, while the metal slat 53 is welded onto the U-profile.

This embodiment of a tubular profile 49, which consists of sections 51 and 53 welded together, has the aspect that, before the sections are welded together, holes can easily be made in the metal slat 51 and internal thread can easily be tapped into these holes.

These threaded holes can be used to attach a bearing structure 28, as will be explained in more detail below.

Figure 12:
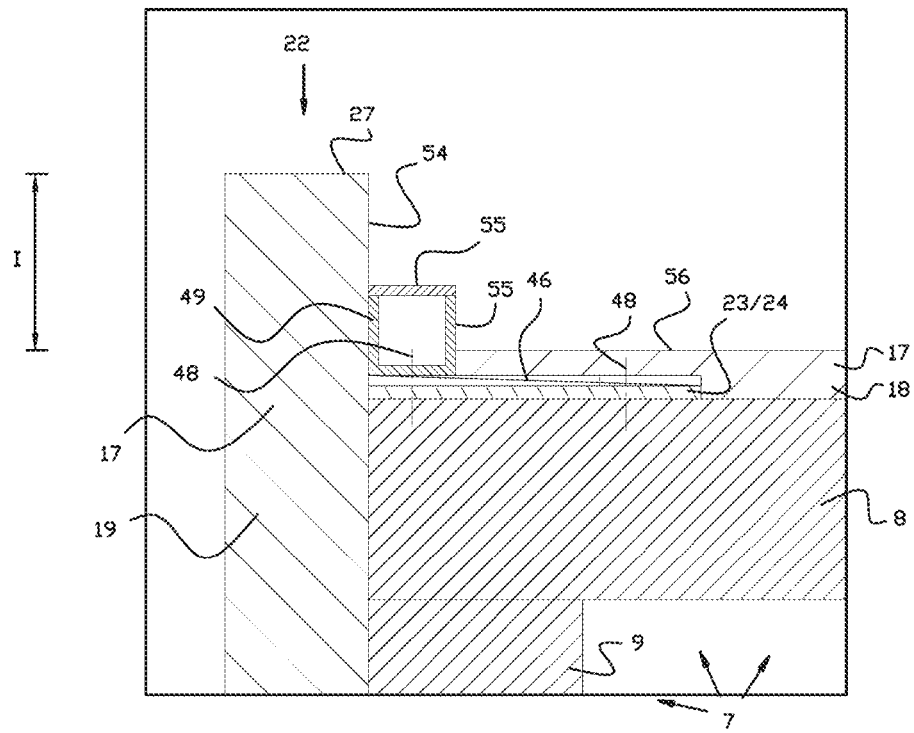
FIG. 12 illustrate in an analogous manner a subsequent step for realising the alternative embodiment of the watertight anchoring according to the present disclosure.

FIG. 12 illustrates the application of parts 18, 19 and 24 of a heat-insulating layer 17, which can be done in a completely similar way as in the previous embodiment.

The metal tubular profile 49 of the metal anchoring 6 is herein provided adjacent to the part 19 of the heat-insulating layer 17 which protrudes with a length I over the roof 1 to form a border 22 on the roof 1.

Figure 13:
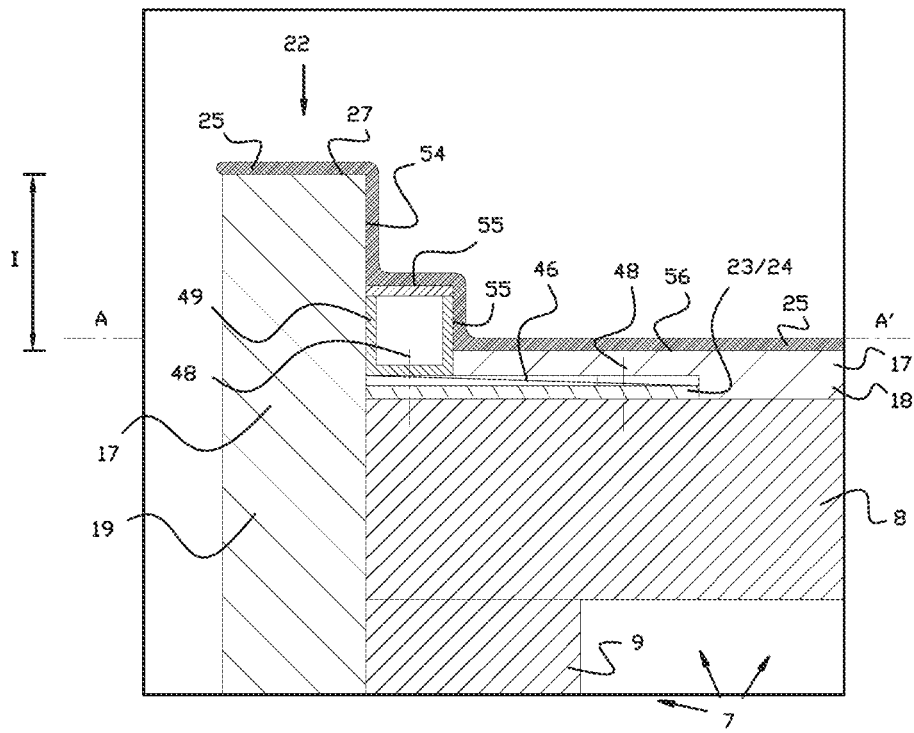
FIG. 13 illustrate in an analogous manner a subsequent step for realising the alternative embodiment of the watertight anchoring according to the present disclosure.

In a following step, as shown in FIG. 13, the first watertight layer 25 is applied, this time without any sheeting 26.

This first watertight layer 25 extends from the top surface 27 to the part 19 of the heat-insulating layer 17 over the side surface 54 thereof, further directly over the free sides 55 of the tubular profile 49 and finally over the entire top surface 56 of the part 18 of the heat-insulating layer 17, which in principle covers the entire roof 1.

Again, it should be noted that the first watertight layer 25 extends over the whole base or support 6, and thus this base or support 6 is completely covered by the first watertight layer 25.

The embodiment of a watertight anchoring 2 according to the present disclosure, illustrated in FIGS. 10 to 16, also differs from the previously discussed embodiment of FIGS. 1 to 9, in that it comprises a metal bearing structure 28 which has a different shape.

More specifically, in this embodiment, the metal bearing structure 28 is obtained with the aid of a metal bearing profile 29 in the form of a Z-profile 57 that has a Z-shaped cross-section 58.

The metal Z-profile 57 is herein provided with an intermediate flank 59 which connects two parallel side flanks 60 and 61.

One side flank 60 is securely fastened to the metal anchoring 6 and the other side flank 61 extends at a certain distance D above the plane AA' of the flat roof 1.

Thus, the bearing structure 28 again comprises a part 61 which, after fastening or suspending the bearing structure 28 to the base or support 6, extends at a certain distance D above the plane AA' of the flat roof 1 or building 1, so that a floating platform is created, as it were, on which the element 3 or 4 to be attached can rest directly.

For securing the side flank 60, fasteners 62 can be used, for example screws which can cooperate with threaded holes 63 provided in the metal slat 53 of the metal tubular profile 49.

Figure 14:
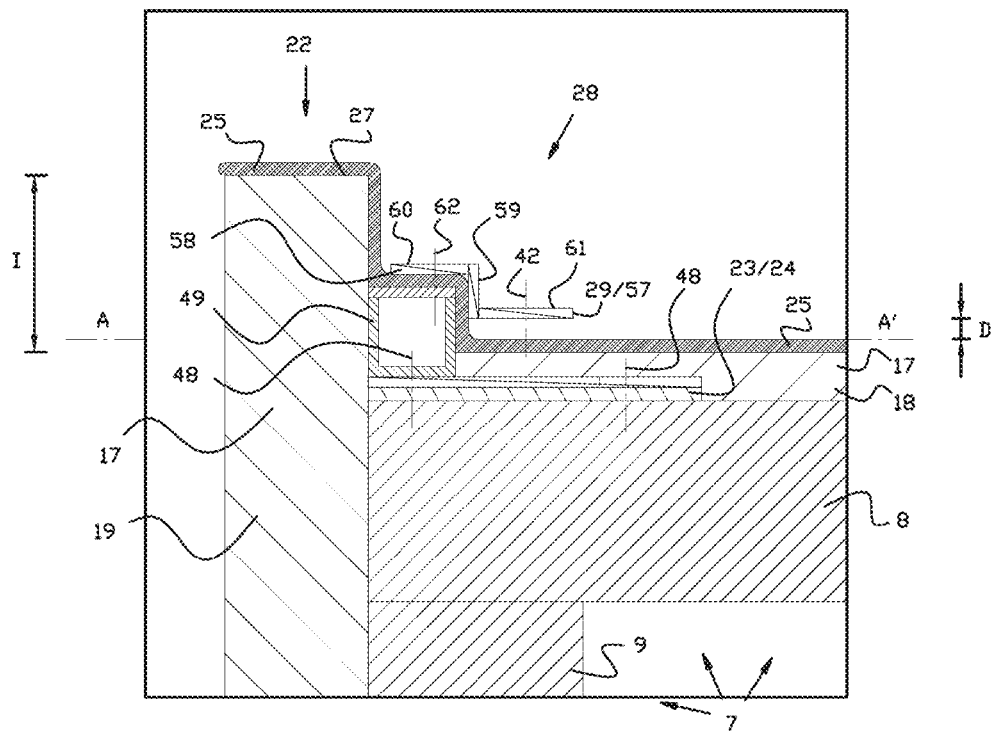
FIG. 14 illustrate in an analogous manner a subsequent step for realising the alternative embodiment of the watertight anchoring according to the present disclosure.

The use of a metal bearing structure 28 with a metal Z-profile 57 is illustrated in FIG. 14.

Figure 15:
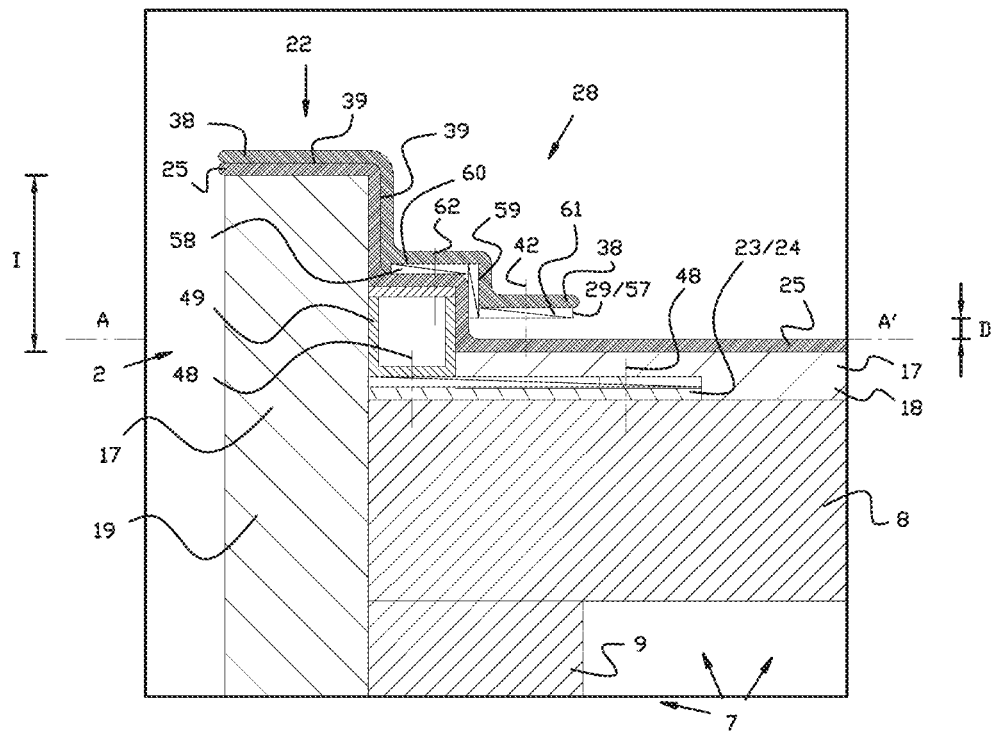
FIG. 15 illustrate in an analogous manner a subsequent step for realising the alternative embodiment of the watertight anchoring according to the present disclosure.

FIG. 15 illustrates how, according to the present disclosure, just as in the preceding embodiment, a second watertight layer 38 is again applied over the metal bearing structure 28 and over parts 39 of the first watertight layer 25 adjacent to the relevant metal Z-profile 57.

Again, the top parts of the bearing profile 29 or bearing profiles 29 of the bearing structure 28 are entirely covered by the second watertight layer 38.

Thus, an alternative embodiment of a watertight anchoring 2 according to the present disclosure was realized.

Figure 16:
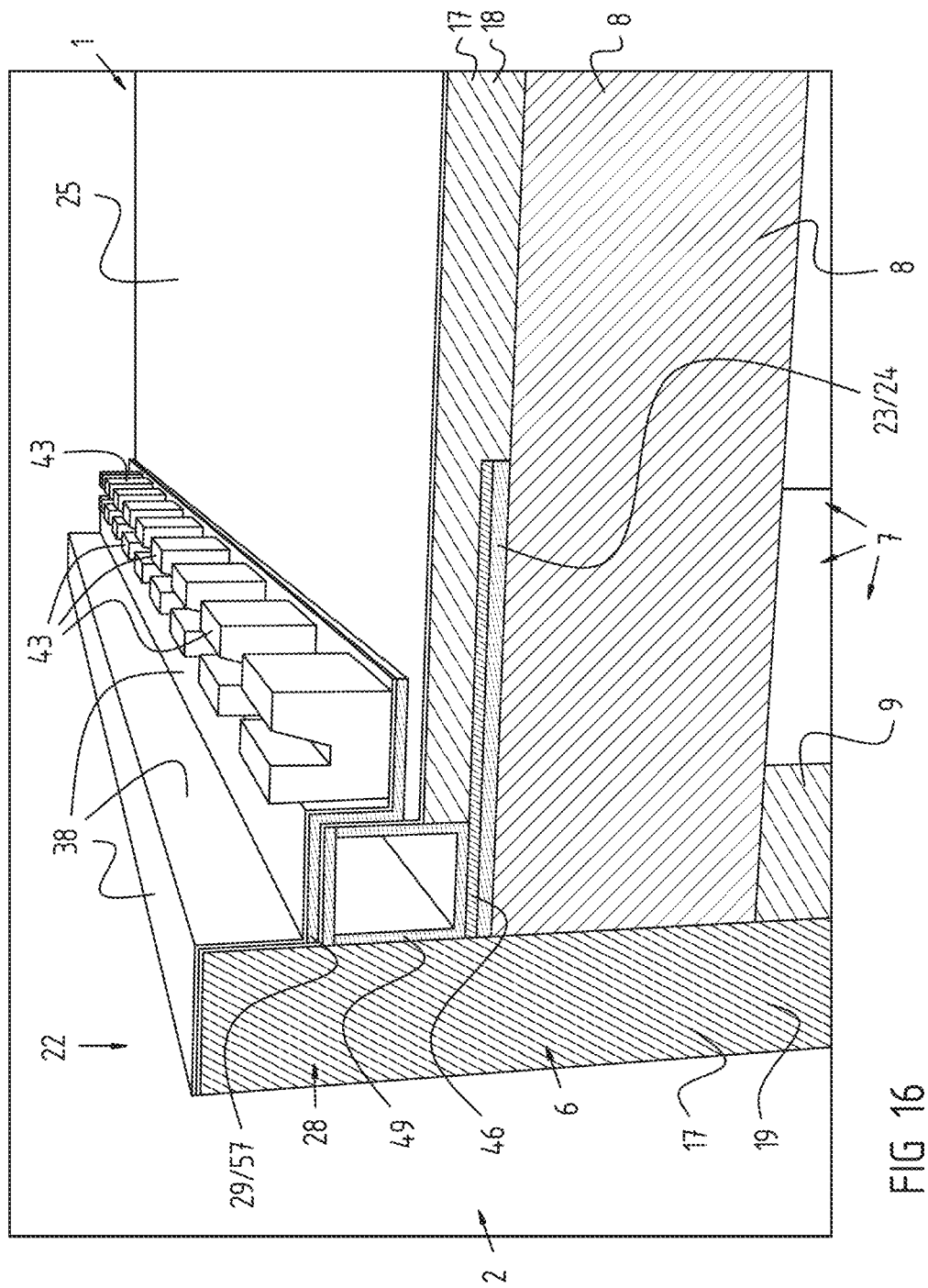
FIG. 16 illustrate in an analogous manner a subsequent step for realising the alternative embodiment of the watertight anchoring according to the present disclosure.

FIG. 16 further illustrates that corner pieces 43 with a V-shaped slot 44 can be fixed to the side flank 61, which extends horizontally at a distance D above the plane AA' of the roof 1, for example to form a balustrade 4 with glass panels 3.

For this purpose, fasteners 42 can be used, which may be completely the same as in the preceding embodiment, but which, according to the present disclosure, may just as well be completely different.

Figure 17:
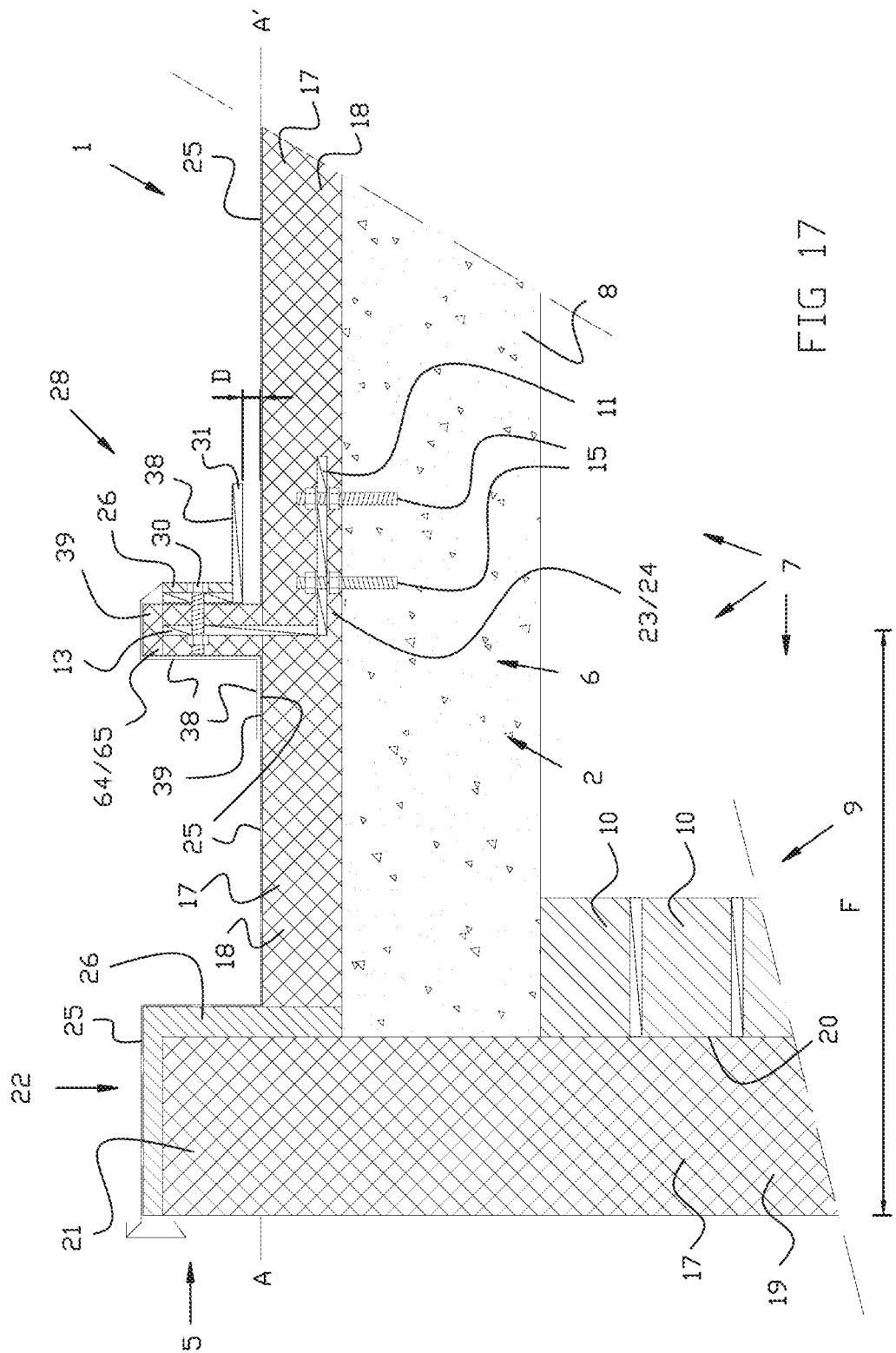
FIG. 17 illustrates in a similar manner as in FIG. 2 a section through a roof, wherein a watertight anchoring according to the present disclosure is applied at a certain distance from the edge of the roof this time; and, FIG. 18 shows in perspective a first profile for forming a base or support of yet another embodiment of a watertight anchoring according to the present disclosure.

FIG. 17 shows yet another embodiment of a watertight anchoring 2 according to the present disclosure, which shows many analogies with the first embodiment, since again L-profiles 11 and 31 were used both for the base or support 6 and for the bearing structure 28.

The L-profile 11 was again anchored in the supporting structure 7 with chemical bolts 15 here, and the L-profile 31 was fastened to the leg 13 of the L-profile 11 in a completely analogous manner as in the first embodiment.

However, a major difference with the first embodiment is that in the embodiment shown in FIG. 17, the base or support 6 is provided at a certain distance F from the side edge 5 of the flat roof 1 and with a straight upright leg 13 protruding from the plane AA' of the flat roof 1.

The part of the leg 13 of the L-profile 11 protruding from the plane AA' of the flat roof 1 is herein surrounded by a heat-insulating material 64 which forms a part 65 of the heat-insulating layer 17, so that the entire metal L-profile 11 is embedded in the heat-insulating layer 17.

The first watertight layer 25 extends over the part 18 and the parts 65 of the heat insulating layer 17 at the watertight anchoring 2.

Again, it should be noted that the first watertight layer 25 stretches over the entire base or support 6, and thus this base or support 6 is completely covered by the first watertight layer 25.

After fixing the bearing profile 29 to the leg 13 of the L-profile 11, a second watertight layer 38 is applied which extends over parts of the L-profile 31, as well as over adjacent parts 39 of the first watertight layer 25.

Again, at least the top parts of the bearing profile 29 or bearing profiles 29 of the bearing structure 28 are entirely covered by the second watertight layer 38.

The above-mentioned adjacent parts 39 of the first watertight layer 25 are this time supported by parts 18 and 65 of the heat-insulating layer 17, however.

To form the base or support 6, instead of an L-profile 11, a T-profile can also be used with a back that is fixed to the supporting structure 7 and an upright part extending perpendicularly to the back in its centre.

Such a base or support 6 is particularly interesting for the case illustrated in FIG. 17.

In another embodiment, it may also be interesting to realise the base or support 6 using one or several L-profiles 11, wherein partitions are provided perpendicular to the legs 13 and 14, for example triangular partitions, in order to better absorb the load applied to the support or base 6 by the bearing structure 28.

FIGS. 18 through 25 illustrate yet another embodiment of a watertight anchoring 2 according to the present disclosure, as well as an application thereof for supporting and anchoring a frame 66 for solar panels 67.

This embodiment of a watertight anchoring 2 according to the present disclosure shows many similarities with the first embodiment that was discussed with reference to FIGS. 1 to 9.

A difference with this first embodiment is that the base or support 6 of the watertight anchoring is formed by one or several support profiles 68 whose shape is slightly different compared to the support profiles 11 used in the embodiment of FIGS. 1 to 9.

More specifically, such a support profile 68 in this case is an elongated, equilateral angular steel with an equilateral, L-shaped cross-section 69 formed by a lying leg 70 and a standing leg 71 that are perpendicular to each other.

The inner corner 72 of the angle steel is provided with a bevel 73 extending along the length L of the support profile 68 and forming an additional reinforcement to maintain the perpendicular position between the two legs 70 and 71 thereof.

The lying leg 70 is further provided with a series of pairs of oval holes 74 and 75 arranged at regular distances E from each other along the length L of the lying leg 70.

The holes 75 are herein located at the bevel 73 and these holes 75 are embedded, so that the head of a bolt extending through such hole 74 fits in the bevel 73, while this head can still rest against a flat area surrounding the hole 75 in question.

The standing leg 71 of the support profile 68 is also provided with a series of round holes 76 arranged at regular distances F from each other along the length L of the support profile 68.

Figure 18:
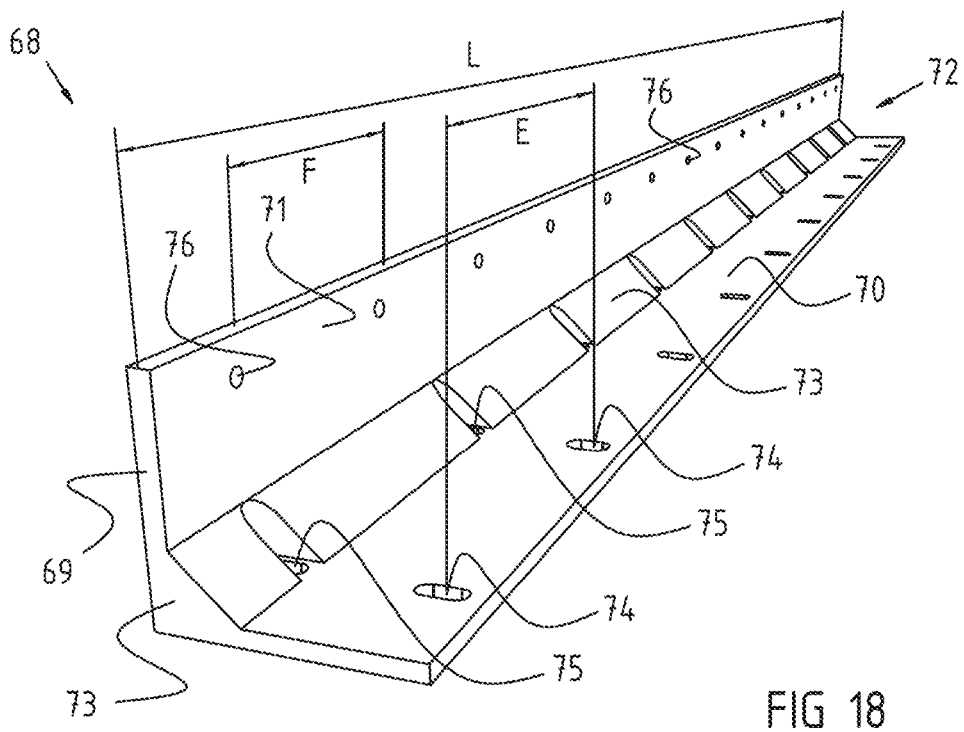
Figure 19:
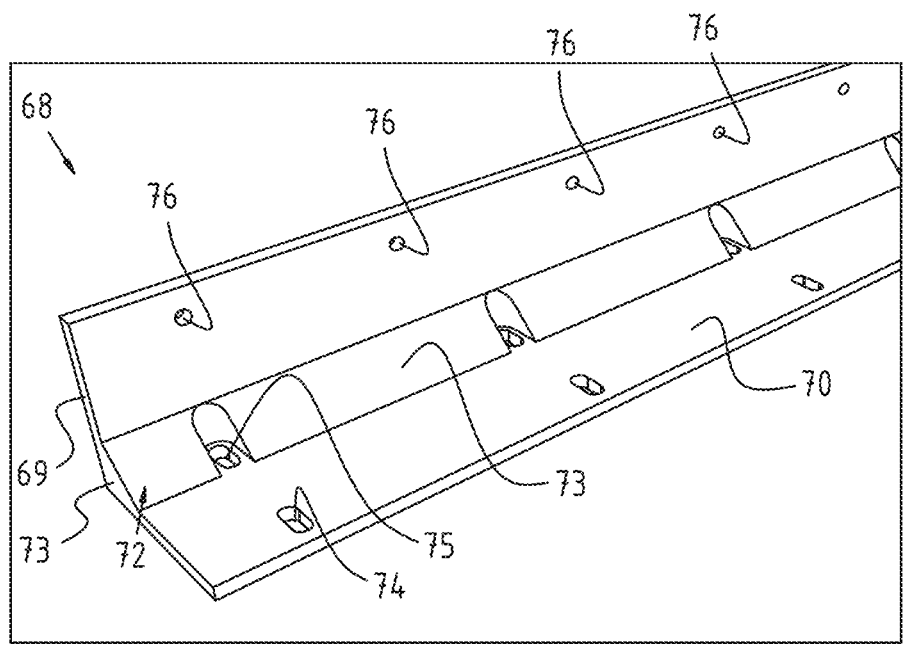
FIG. 19 shows in another perspective the first profile for forming a base or support of yet another embodiment of the watertight anchoring according to the present disclosure.

All this is illustrated by FIGS. 18 and 19.

The bearing structure 28 of a watertight anchoring 2 according to the present disclosure in the embodiment discussed here is intended to be suspended from the base or support 6 formed by one or several support profiles 68.

This bearing structure 28 is formed by one or several bearing profiles 77 which is or are fixed to the base or support 6 by fasteners 30.

These fasteners 30 are not shown in the figures and, just as in the preceding embodiments, they are releasable fasteners 30 which are formed here also, for example, by bolts and nuts or by screws which can be screwed into internally threaded holes.

It is important to understand that, according to the present disclosure, the bearing structure 28 is suspended from the support or base 6 and serves to bear the element 3 or 4 to be anchored, just as a bookshelf is suspended from a wall and bears the books, of course by hanging on the wall or leaning on it.

To this end, a bearing profile 77 is in this case designed as an elongated, irregular, asymmetrical T-profile 77 formed by a lying leg 78 and a standing leg 79 which are perpendicular to each other.

The standing leg 79 herein extends on both sides of the lying leg 78, with a wide section 80 provided with round holes 81 at regular distances G from each other on the one hand, and with a narrow section 82 on the other hand.

The distance G between the holes 81 is equal to the distance F between the round holes in a support profile 68, so that the connection between a bearing profile 77 and a support profile 68 can be made using the above-mentioned fasteners 30.

The inner corner 83 between the narrow section 82 of the standing leg 79 and the lying leg is provided with a bevel 84 which again ensures the perpendicular position of the lying leg 78 on the standing leg 79.

This bevel 84 provides a very efficient reinforcement of the bearing profile 77, since the bearing profile 77 has to be suspended at the holes 81 from a support profile 68 and is heavily loaded vertically by the element 3 or 4 to be anchored at the lying leg 78 of the bearing profile 77.

The bevel 84 thus contributes enormously to absorbing the torque exerted thereby by the load on the lying leg 78.

Figure 20:
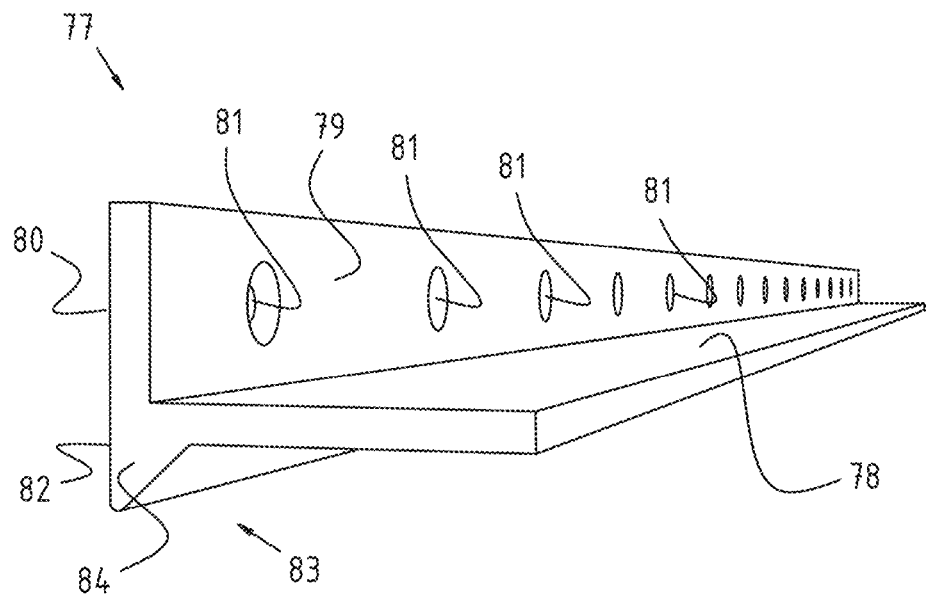
FIG. 20 shows in perspective a second profile for forming a bearing structure for a watertight anchoring according to the present disclosure in this other embodiment.
Figure 21:
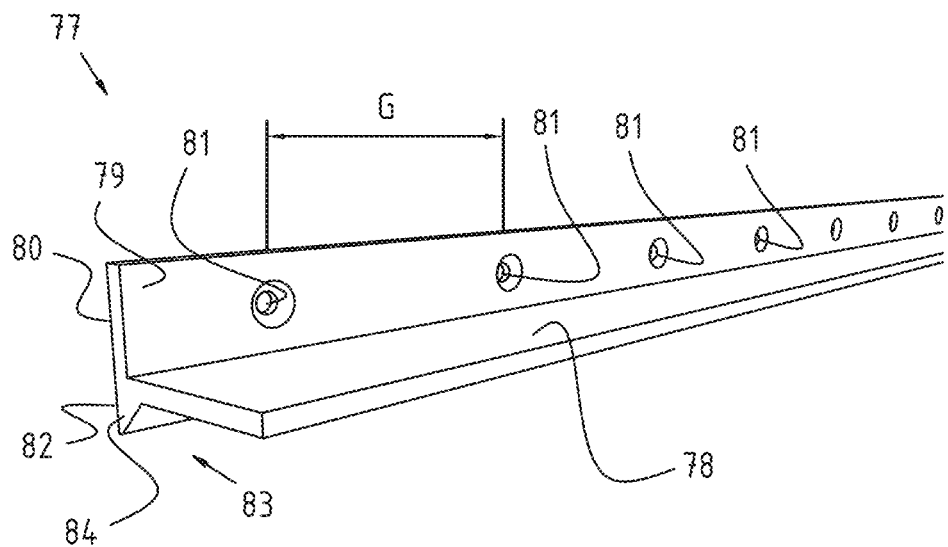
FIG. 21 shows in another perspective the second profile for forming a bearing structure for the watertight anchoring according to the present disclosure in this other embodiment.

All this is illustrated by FIGS. 20 and 21.

Figure 22:
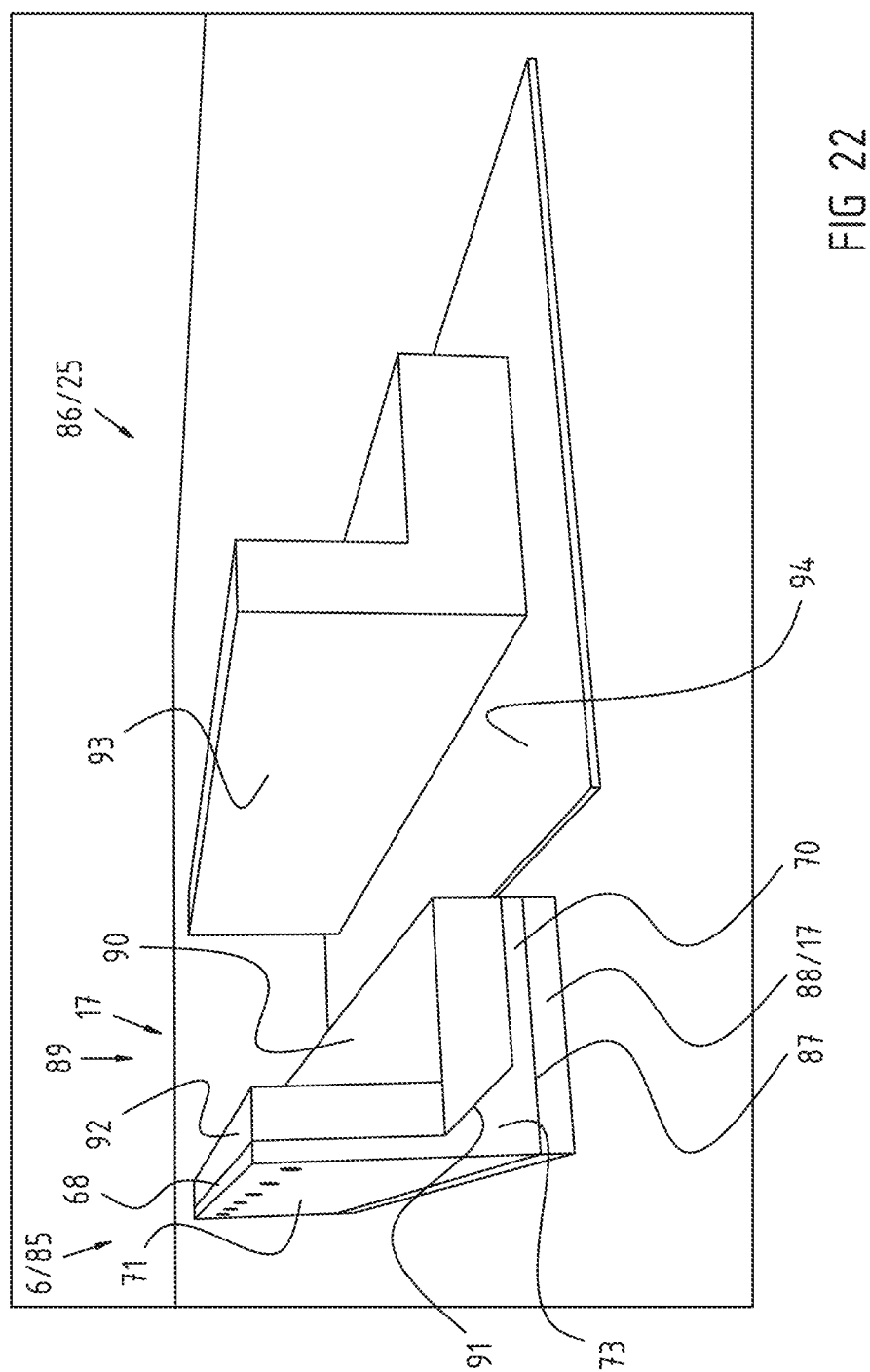
FIG. 22 illustrates in perspective a possibility for assembling such the watertight anchoring according to the present disclosure in this other embodiment.

FIG. 22 illustrates another very interesting aspect of this embodiment of a watertight anchoring 2 according to the present disclosure.

After all, just as in the preceding embodiments, the aim is to apply a heat-insulating layer 17 with which parts of the building 1 are covered, as well as the support profiles 68 used for the watertight anchoring 2, or wherein such a support profile is embedded in the heat-insulating layer 17.

Similarly, as was the case in the preceding embodiments, the aim is to apply a first watertight layer 25 over the heat-insulating layer 17 and over the base or support 6 afterwards, with this base or support 6 being completely covered by the first watertight layer 25.

To facilitate the application of the heat-insulating layer and the first watertight layer 25, it is possible, according to the present disclosure, to use a first prefabricated element 85 and a second prefabricated element 86.

The first prefabricated element 85 is herein composed of a support profile 68 which is already provided with a heat-insulating layer 17.

More specifically, the bottom side 87 of the support profile 68 is covered by a heat-insulating part 88 which is glued to this bottom side 86, for example.

Also the top side 89 of the support profile 68 is covered by a heat-insulating layer 17, wherein more specifically the lying leg 70 is covered by a heat-insulating part 90 which is provided with a complementary bevel 91 at the bevel 73 of the support profile 68, and wherein the standing leg 71 is covered by a heat-insulating part 92 which connects to the heat-insulating part 90.

The result is a base or support 6 wrapped in heat-insulating material which takes the form of an elongated L-profile 85.

The second prefabricated element 86 consists solely of the material of the first watertight layer 25 and is designed as a cap 93 which is complementary to the shape of the first prefabricated element 85 and which is provided at its edges with a surrounding hem 94 which forms a kind of flat flange at the cap 93.

The second prefabricated element 86 thus has a cavity into which the elongated L-profile 85 can be inserted in a fitting manner, so that the base or support 6 is completely covered by the first watertight layer 25, as well as parts of the building 1 that are adjacent to the relevant elongated L-profile 85.

Figure 23:
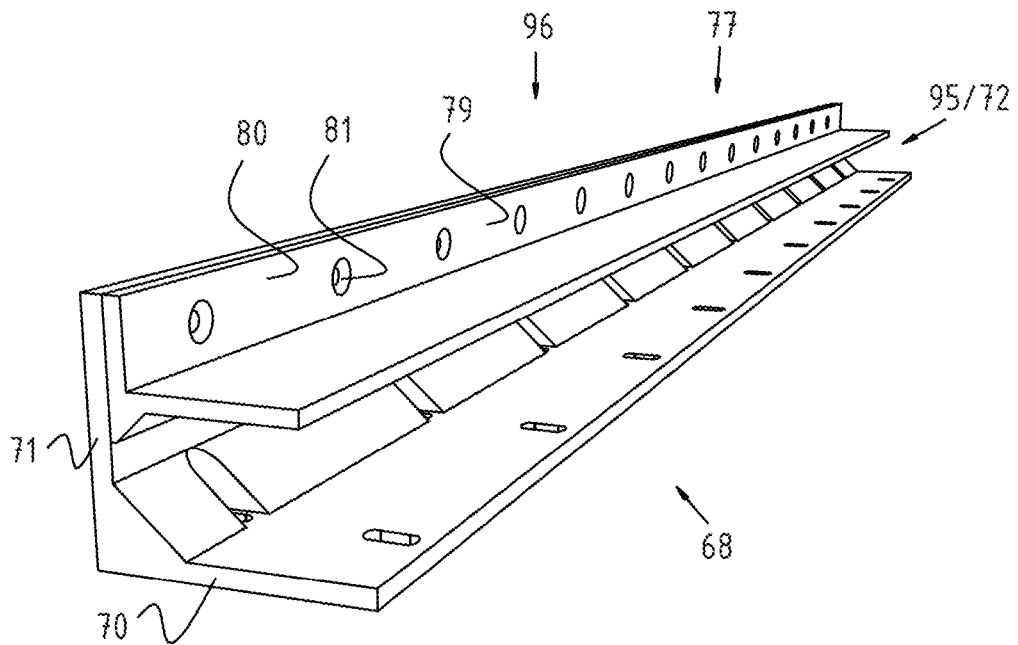
FIG. 23 illustrates in perspective another possibility for assembling such the watertight anchoring according to the present disclosure in this other embodiment.
Figure 24:
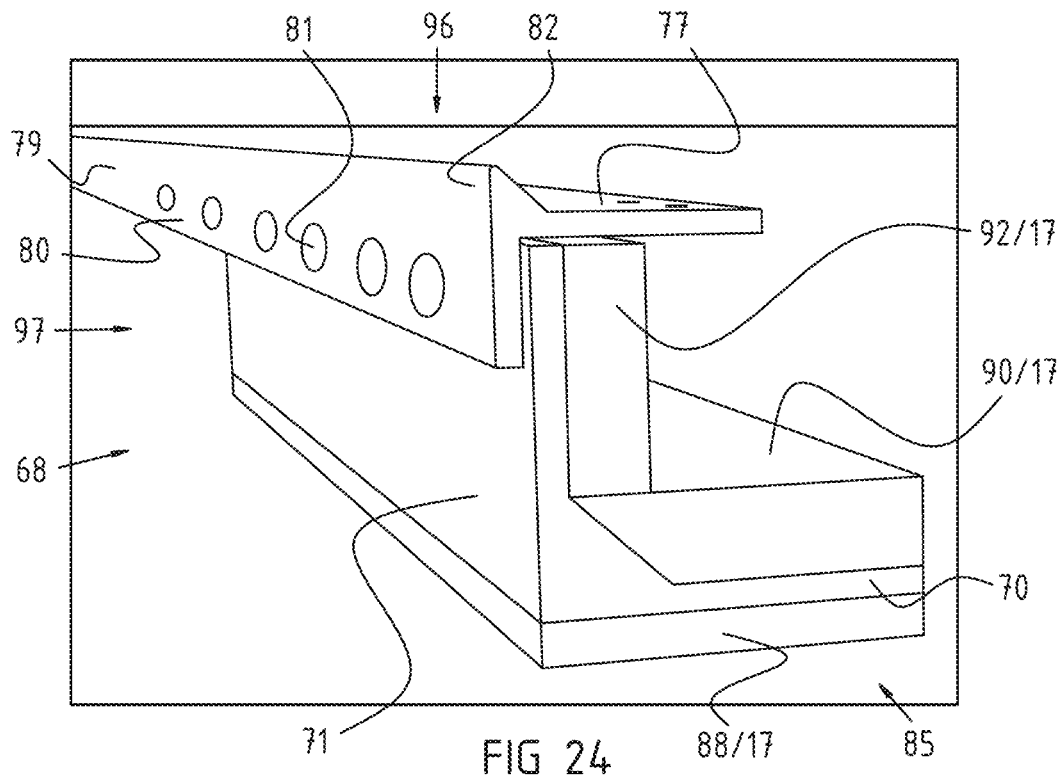
FIG. 24 illustrates in perspective yet another possibility for assembling such the watertight anchoring according to the present disclosure in this other embodiment.

FIGS. 23 and 24 further illustrate that a bearing profile 77 can be connected to a support profile 68 in different ways.

In the case of FIG. 23, the bearing profile 77 is fixed to the side 95 of the inner corner 72 of the support profile 68 against the standing leg 71 of the support profile 68, with the wide section 80 of the standing leg 79 of the bearing profile 77, which is provided with the fixing holes 81, facing the top side 96.

In the case of FIG. 24, the bearing profile 77 is fixed on the outside 97 to the standing leg 71 of the support profile 68, with the narrow section 82 of the standing leg 79 of the bearing profile 77 facing the top side 96 this time.

A prefabricated element 85 was used here, wherein the support profile 68 was already embedded in a heat-insulating layer 17.

FIGS. 23 and 24 are only meant to illustrate the non-uniform mutual positioning of the bearing profile 77 and a support profile 68, and the first and second watertight layers 25 and 38, as well as the fasteners 30 are not shown here.

Figure 25:
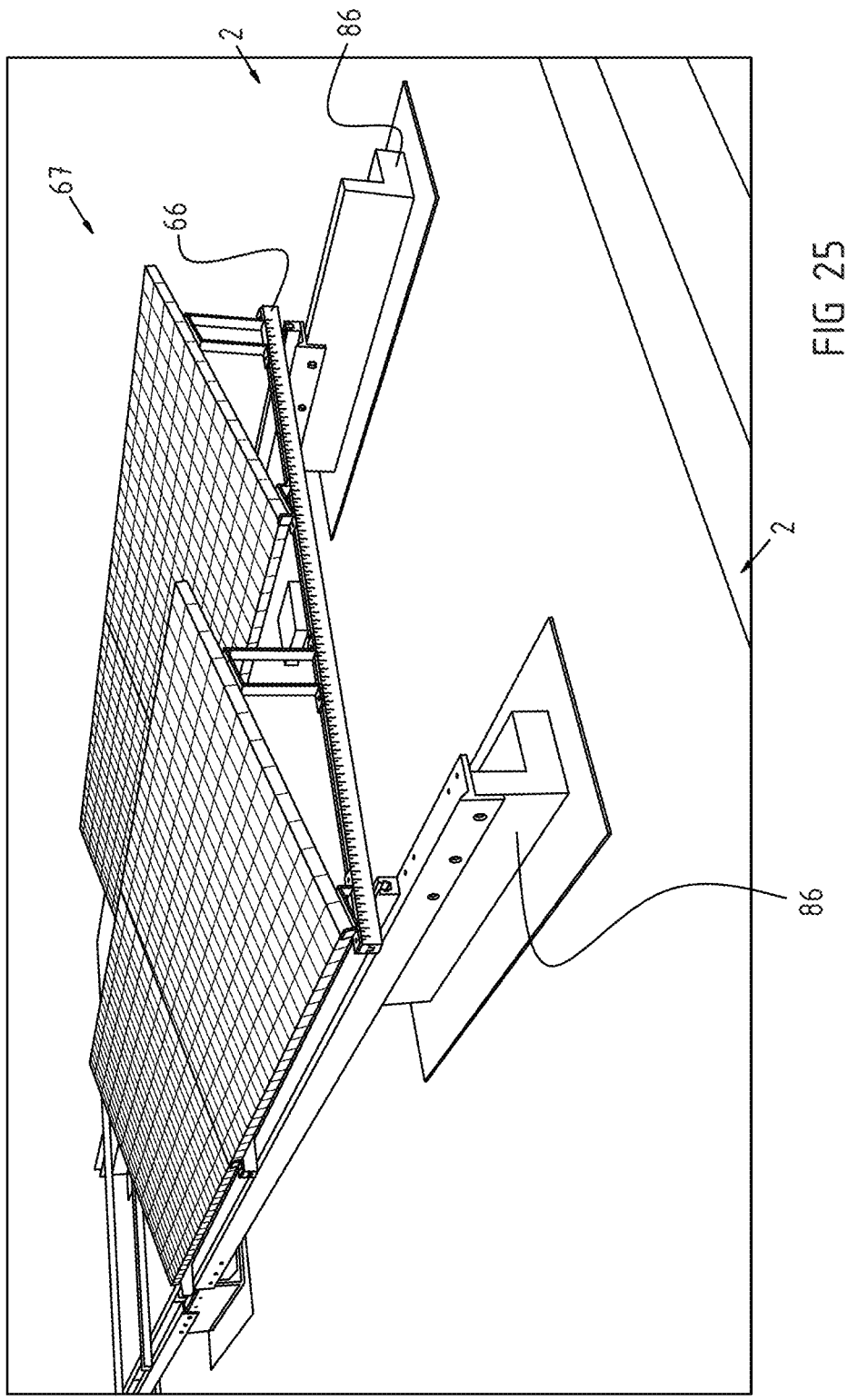
FIG. 25 illustrates in perspective the application of a watertight anchoring according to the present disclosure in this other embodiment for supporting a frame for solar panels.

An arrangement as illustrated in FIG. 24, for example, is very interesting to anchor a frame 66 that serves to support solar panels 67, which is illustrated as an example in FIG. 25.

The present disclosure is not limited to the embodiments of a watertight anchoring 2 described as an example and illustrated with reference to the figures; on the contrary, such a watertight anchoring 2 can be realised in other ways while still remaining within the scope of the present disclosure.

Furthermore, the present disclosure is not limited to the methods for securely fixing elements to a roof or building, described as examples and illustrated with reference to the figures; on the contrary, other methods may be used for this purpose while still remaining within the scope of the present disclosure.

The invention claimed is:

1. A watertight anchoring for securely fastening elements, to a building, the watertight anchoring comprises:
    a base or support formed by one or several support profiles or support slats for securely mounting to or anchored in a supporting structure of the building;
    a heat-insulating layer for covering with which parts of the building, and with which the support profiles or support slats or parts thereof are covered, or in which the support profiles or the support slats are embedded;
    a first watertight layer applied over the heat-insulating layer and over the base or support, wherein the base or support is completely covered by the first watertight layer;
    a bearing structure suspended from or fixed to the base or support and formed by one or several bearing profiles that are fixed to or mounted on the base or support and tightened against the first watertight layer by fasteners; and
        a second watertight layer provided over parts of the bearing profiles and over parts of the first watertight layer which are adjacent to the relevant bearing profiles.

2. The watertight anchoring according to claim 1, wherein the second watertight layer is provided over top parts of the bearing profile or the bearing profiles of the bearing structure and wherein at least the top parts of the bearing profile or the bearing profiles of the bearing structure are completely covered by the second watertight layer.

3. The watertight anchoring according to claim 1, wherein the watertight anchoring is suitable for anchoring the base of a post or column and/or an edge of a wall.

4. The watertight anchoring according to claim 1, wherein the watertight anchoring comprises two separate parts which are connected to each other by fasteners, namely a base or support on the one hand which is anchored in a supporting structure of the building and which forms a section of the watertight anchoring with which an entire construction consisting of the element to be fixed and the watertight anchoring rests on the building, and the bearing structure fixed to the latter on the other hand, borne by the base or support and which is designed to directly support or bear the actual element to be fixed.

5. The watertight anchoring according to claim 1, wherein that the bearing structure comprises a part which, after the bearing structure has been fixed to or suspended from the base or support, extends at a certain distance above a plane of a roof or the building, so that a floating platform is created on which the element to be fixed can rest directly.

6. The watertight anchoring according to claim 1, wherein the bearing structure comprises one of the following shapes:
    an L-profile with an L-shaped cross section consisting of two legs placed perpendicularly to each other, one leg of which is fixed to the base or support whereas the other leg extends at a certain distance above a plane of a flat roof or the building; or
    a Z-profile with a Z-shaped cross-section comprising an intermediate flank that connects two parallel side flanks, wherein one side flank is securely fixed to the base or support and the other side flank extends at a certain distance above the plane of the flat roof or the building.

7. The watertight anchoring according to claim 1, wherein the watertight anchoring comprises an adjusting device allowing a height of the base or support to be adjusted in relation to the supporting structure.

8. The watertight anchoring according to claim 1, wherein the base or support comprises one of the following shapes:
    an L-profile with an L-shaped cross section consisting of two legs placed perpendicularly to each other, one leg of which is fixed to the supporting structure of the building; or,
    a series of support slats fixed parallel to each other and at regular intervals to the supporting structure of the building and wherein across the series of support slats is provided a U-profile with a U-shaped cross-section or a tubular profile with a tubular cross-section, which is either or not composed of a U-profile combined with a slat and wherein the U-profile or tubular profile is securely fixed to the support slats.

9. The watertight anchoring according to claim 1, wherein the heat-insulating layer consists of mats or sheets that are mainly made of non-flexible heat-insulating material.

10. The watertight anchoring according to claim 8, wherein between the support profiles and/or the support slats of the base or support and the supporting structure of the building is provided a heat-insulating material to prevent the formation of a cold bridge to the supporting structure.

11. The watertight anchoring according to claim 1, wherein the heat-insulating layer covers at least parts of a flat roof and also forms a standing edge on one or several side edges of the flat roof so as to form a border on the flat roof.

12. The watertight anchoring according to claim 11, wherein a sheeting is provided at the border on the flat roof between the first watertight layer and parts of the heat-insulating layer and/or parts of the base or support.

13. The watertight anchoring according to claim 6, wherein the L-profile or the L-profiles is or are fitted with an upright standing leg against a border of the flat roof formed by the heat-insulating layer.

14. The watertight anchoring according to claim 6, wherein the L-profile or the L-profiles is or are provided at a certain distance from a side edge of the flat roof and protrudes or protrude from the plane of the flat roof with an upright standing leg.

15. The watertight anchoring according to claim 8, wherein the U-profile or tubular profile of the base or support is provided against the border formed by the heat-insulating layer.

16. A method for securely fastening elements, to a building, the method comprises;
    providing a watertight anchoring by first forming a base or support by securely mounting or anchoring one or several metal support profiles or metal support slats to or in a supporting structure of the building;

subsequently covering parts of the building, as well as the base or support or parts thereof with a heat-insulating layer and/or embedding the base or support in the heat-insulating layer;

applying a first watertight layer over the heat-insulating layer and the base or support;

suspending or fixing a bearing structure from or to the base or support by securely mounting one or several bearing profiles on the base or support and tightened against the first watertight layer by fasteners;

applying a second watertight layer over parts of the bearing profiles and over parts of the first watertight layer that are adjacent to the respective bearing profiles; and, securely mounting the element to be fixed on the bearing structure of the watertight anchoring.

17. The watertight anchoring according to claim 11, wherein the L-profile or the L-profiles is or are fitted with an upright standing leg against a border of the flat roof formed by the heat-insulating layer.

18. The watertight anchoring according to claim 11, wherein the L-profile or the L-profiles is or are provided at a certain distance from a side edge of the flat roof and protrudes or protrude from the plane of the flat roof with an upright standing leg.

19. A watertight anchoring for securely fastening elements to a building, the watertight anchoring comprises:

a base anchored in a supporting structure of the building;

a heat-insulating layer that covers at least part of the building and at least part of the base;

a first watertight layer applied over the heat-insulating layer and over the base, the first watertight layer completely covers the base;

a bearing structure coupled to the base, the bearing structure formed by at least one bearing profile that is coupled to the base and tightened against the first watertight layer by fasteners; and a second watertight layer provided over parts of the at least one bearing profile and over parts of the first watertight layer adjacent to relevant bearing profiles.

20. The watertight anchoring according to claim 19, wherein the base is formed by at least one support profile or at least one support slat that anchored in the supporting structure of the building.

21. The watertight anchoring according to claim 1, wherein the first watertight layer and the second watertight layer are joined together in adjacent parts.

* * * * *